April 29, 1958     A. R. SUMMERS     2,832,615

PIPE-IN SOCKET JOINT WITH WEDGING CLIPS

Filed Nov. 12, 1954

INVENTOR.
Arnold R. Summers
BY
Hamilton & Hamilton
Attorneys.

United States Patent Office 2,832,615
Patented Apr. 29, 1958

2,832,615

PIPE-IN-SOCKET JOINT WITH WEDGING CLIPS

Arnold R. Summers, Leawood, Kans., assignor of one-half to Arthur E. Blair, Kansas City, Mo.

Application November 12, 1954, Serial No. 468,404

1 Claim. (Cl. 285—342)

This invention relates to new and useful improvements in pipe joints, and relates particularly to pipe joints of the type wherein one of the pipe ends is plain and the other pipe end is formed to present a socket adapted to receive the plain pipe end, the joint being sealed by a packing ring encircling the plain pipe end and pressed into close engagement therewith by a packing gland carried by the socketed pipe end. This type of joint is in common usage particularly in cast iron piping, wherein the pipes are furnished in standard lengths, each with one plain end and with its opposite end forming an enlarged integral socket.

The joint as described above forms an efficient pressure seal, but is inherently weak in its ability to support a thrust load, since the only force resisting axial separation of the joint by the fluid pressure contained within the pipe is the friction of the packing ring against the periphery of the plain by end. It is customary, when using piping of this sort for pressure fluids, to reinforce each joint by means of external brace members each fixed at its respective ends to adjacent pipe sections and bridging the intervening joint. The principal object of the present invention, therefore, is the provision of new and novel means, in a pipe joint of the general class described for providing good thrust strength.

Other objects are the provision of a pipe joint of the character described which is extremely simple and economical in construction, dependable and efficient in operation, not likely to get out of order, and which is adapted to incorporate therein with little or no alteration the parts of pre-existing conventional joints.

With these objects in view, as well as other objects which will appear in the course of the specification, reference will be had to the drawing, wherein.

Figure 1:
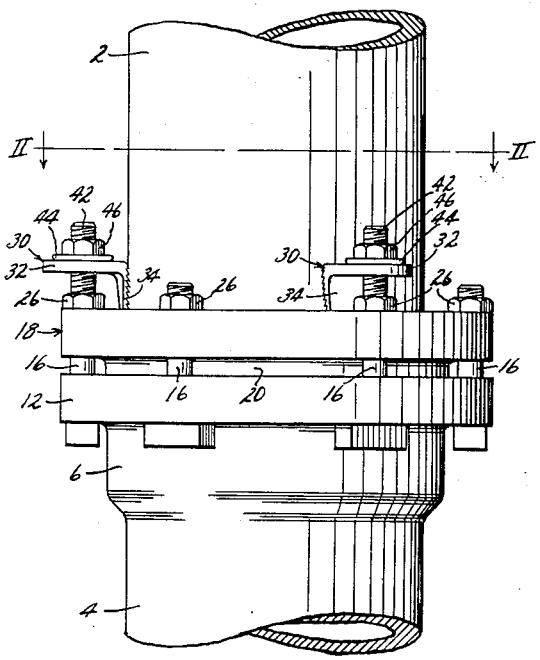
Fig. 1 is a side elevational view of a pipe joint embodying the present invention.
Figure 3:
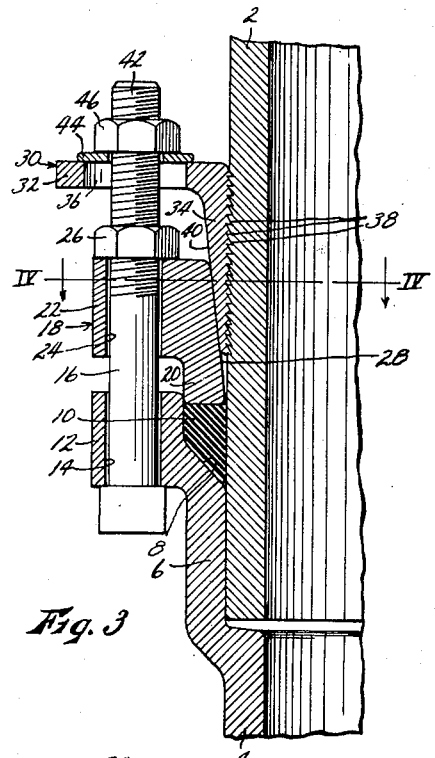
Fig. 3 is an enlarged fragmentary sectional view taken on line III—III of Fig. 2, with parts left in elevation.
Figure 2:
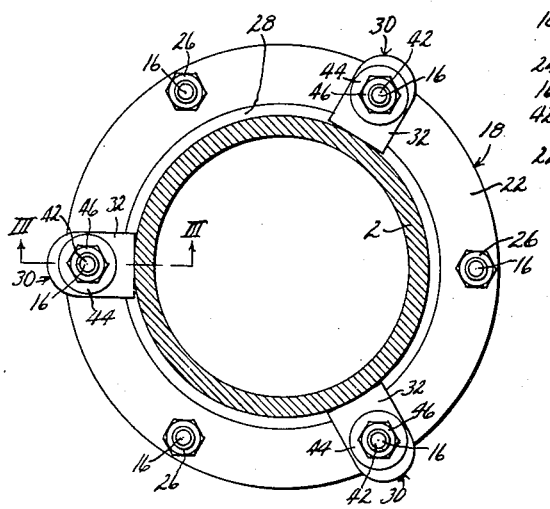
Fig. 2 is a sectional view taken on line II—II of Fig. 1.

Like reference numerals apply to similar parts throughout the several views, and the numerals 2 and 4 apply respectively to a pair of pipes of cylindrical form and like diameter to be joined together. The end of pipe 2 is plain, while the end portion of pipe 4 is enlarged to form a socket 6 in which the plain end of pipe 2 is adapted to be slidably inserted as shown when the pipes are in axial alignment. The outer end portion of socket 6 is enlarged in diameter to form an annular recess 8 in which is positioned a packing ring 10 made of a compressible material. The socket portion 6 is provided at its extreme end with a radially extending peripheral flange 12, having holes 14 formed therethrough parallel to the axis of the pipe, at regularly spaced intervals thereAround. A T-head bolt 16 is positioned through each of said holes.

A gland ring 18 encircles pipe 2, and comprises a substantially cylindrical ring 20 which fits closely but slidably about pipe 2 and has an outer diameter substantially equal to the diameter of packing ring recess 8. Ring 20 is provided at its outer end with a radially extending peripheral flange 22 which matches with but is spaced apart from flange 12, and has holes 24 formed therethrough matching with holes 14 of flange 12. Each of bolts 16 extends through the matching hole 24 of flange 22, and has a nut 26 threaded on the extended end thereof. It is apparent that when nuts 26 are tightened, the gland ring 20 enters packing ring recess 8, and is forced into compressive engagement with packing ring 10, which is thereby pressed into firm contact with pipe 2 to form a seal. It will be seen that the central aperture 28 of the gland ring is conical in form, fitting closely about pipe 2 at the inner end of gland ring 2 and being taperingly enlarged toward the outer face of flange 22.

Figure 4:
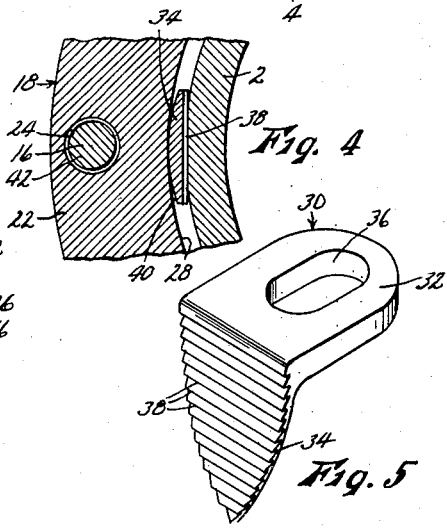
Fig. 4 is a fragmentary sectional view taken on line IV—IV of Fig. 3.
Figure 5:
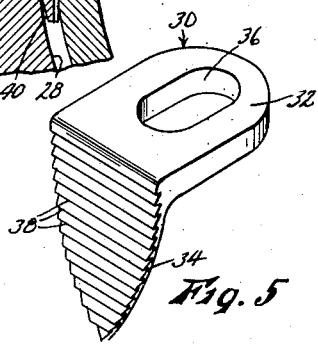
Fig. 5 is a detached perspective view of one of the securing clips.

A number of clips 30 are used in connection with the joint. As shown in Fig. 5, each clip 30 is substantially L-shaped, comprising a pair of mutually right angled legs 32 and 34. Leg 32 is planar, and has a longitudinally elongated slot 36 formed therein. The outer face of leg 34 is generally flat, the surface thereof being grooved whereby to form sharp edged teeth 38 extending transversely thereacross. The inner face 40 of leg 34 is conically curved, being transversely convex as shown in Fig. 4, and the leg being taperingly thinner toward its free end.

In use, a clip 30 may be used in connection with each of bolts 16, or any of them, a clip being shown in conjunction with alternate bolts in the drawing. Each bolt to which a clip is to be attached is of substantially extended length. The longer bolts are further designated by the numeral 42. A clip is placed on the bolt so that the bolt extends through the slot 36 of clip leg 32, and clip leg 34 extends into the tapered space between pipe 2 and the inner periphery of gland ring 18. A washer 44 and nut 46 are positioned on the extended end of each bolt 42, and the nuts are drawn up evenly. The clip legs 34 are thereby wedged tightly against pipe 2, the teeth 38 thereof being caused to bite into the pipe wall. Thereafter, any force tending to push pipe 2 out of socket 6 is transmitted through clips 30 and bolts 42 to pipe 4. The teeth 38 are sloped to prevent any separating movement of the pipes.

It will be noted that as clips 30 are drawn into place by nuts 46, they tend to force the gland ring still further inwardly against the packing ring, to force it still more tightly against pipe 2, and the clips will of course thereafter hold the gland ring against any outward movement. For this reason, it is apparent that if desired, the nuts 26 on bolts 42 could be dispensed with. However, said nuts are useful in providing for initial compression of the packing ring before the addition of the clips.

The toothed face of clip leg 34 is shown as generally planar, so that its teeth cut deepest into the pipe along the central longitudinal portion of the leg. Also, the opposite face 40 of clip leg 34 is curved to a conical radius somewhat smaller than the inner periphery 28 of the gland ring, so that contact therebetween occurs along the central longitudinal portion of the leg. Obviously, if desired, the toothed face could be made arcuate to conform to the face of the pipe, and face 40 could be curved to provide substantially full area contact with the gland ring. This would improve the holding power of the clip somewhat, but the clip would then be adapted for use with pipe of only one diameter. Making the clip as actually shown does not seriously impair its holding power, and it is thereby adapted for use on pipes over a substantial range of sizes. The radial elongation of clip slot 36 also permits the use of the clips in joints wherein the distance between the pipe surface and the bolt ring may vary.

The structure as shown, except for clips 30 and the extension of some of the bolts to engage the clips, is conventional. Many conventional joints of this type provide even a gland ring having a tapered inner periphery. Such conventional joints may thus be very simply and economically altered to function in the manner of my invention, requiring only the addition of the clips and the substitution of longer bolts.

While I have shown and described a specific embodiment of my invention, it will be apparent that many minor changes of structure and operation could be made without departing from the spirit of the invention as defined by the scope of the appended claim.

What I claim as new and desire to protect by Letters Patent is:

In a pipe joint including a socket member fixed to the first pipe to be joined and adapted to receive slidably therein the plain end portion of the second pipe, the outer end portion of said socket being enlarged to form a packing ring recess, the combination of a compressible packing ring positioned in said recess, a gland ring encircling said second pipe adjacent said socket member, and projecting into said recess and engaging said packing ring, the inner periphery of said gland ring being taperingly enlarged toward the face thereof distal from said socket member, a plurality of wedge-shaped clips projecting into the space between said gland ring and said second pipe, the surfaces of said clips in engagement with said pipe having teeth formed thereon adapted to bite into said pipe, each of said clips being formed with a leg extending radially of the pipe and having a hole formed therethrough, said socket member and said gland ring each being provided with a radial flange, said flanges having matching sets of holes formed therethrough and being spaced apart longitudinally of said joint both from each other and from the radial legs of said clips, a plurality of bolts each extending through one set of matching holes in said flanges and through the hole in the radial leg of one of said clips, and a pair of nuts on each of said bolts, the head of said bolt engaging said socket member flange and said nuts engaging respectively the distal faces of said gland ring flange and said radial clip leg, whereby said gland ring is urged compressively against said packing ring and said clips are wedged against the external surface of said second pipe.

References Cited in the file of this patent

UNITED STATES PATENTS

| | | |
|---|---|---|
| 436,574 | Bramwell | Sept. 16, 1890 |
| 784,400 | Howe | Mar. 7, 1905 |
| 1,063,926 | Schuermann | June 3, 1913 |
| 1,447,192 | Watson | Mar. 6, 1923 |
| 1,604,580 | Jaques | Oct. 26, 1926 |
| 1,782,737 | Mahon | Nov. 25, 1930 |

FOREIGN PATENTS

| | | |
|---|---|---|
| 111,783 | Australia | Nov. 7, 1940 |